United States Patent
Sung

(10) Patent No.: US 8,352,260 B2
(45) Date of Patent: Jan. 8, 2013

(54) MULTIMODAL UNIFICATION OF ARTICULATION FOR DEVICE INTERFACING

(76) Inventor: Jun Hyung Sung, Sungnam (KR)

( * ) Notice: Subject to any disclaimer, the term of this patent is extended or adjusted under 35 U.S.C. 154(b) by 784 days.

(21) Appl. No.: 12/556,700

(22) Filed: Sep. 10, 2009

(65) Prior Publication Data

US 2010/0070268 A1   Mar. 18, 2010

Related U.S. Application Data

(60) Provisional application No. 61/136,502, filed on Sep. 10, 2008.

(51) Int. Cl.
*G10L 15/00* (2006.01)
(52) U.S. Cl. ........ 704/231; 704/235; 704/251; 704/257; 704/270; 704/203
(58) Field of Classification Search .................. 704/270, 704/203, 232, 235, 251, 257
See application file for complete search history.

(56) References Cited

U.S. PATENT DOCUMENTS

| | | | |
|---|---|---|---|
| 4,829,576 A | 5/1989 | Porter | |
| 5,526,463 A | 6/1996 | Gillick et al. | |
| 5,615,296 A | 3/1997 | Stanford et al. | |
| 5,677,991 A | 10/1997 | Hsu et al. | |
| 5,884,257 A | 3/1999 | Maekawa et al. | |
| 6,499,025 B1 | 12/2002 | Horvitz et al. | |
| 6,990,639 B2 | 1/2006 | Wilson | |
| 7,299,178 B2 | 11/2007 | Yoon et al. | |
| 7,716,039 B1* | 5/2010 | Bangalore et al. | 704/9 |
| 2003/0093419 A1* | 5/2003 | Bangalore et al. | 707/3 |
| 2006/0077174 A1* | 4/2006 | Chung et al. | 345/156 |
| 2009/0013255 A1* | 1/2009 | Yuschik et al. | 715/728 |

* cited by examiner

*Primary Examiner* — Qi Han
(74) *Attorney, Agent, or Firm* — The PL Law Group, PLLC

(57) ABSTRACT

A system for a multimodal unification of articulation includes a voice signal modality to receive a voice signal, and a control signal modality which receives an input from a user and generates a control signal from the input which is selected from predetermined inputs directly corresponding to the phonetic information. The interactive voice based phonetic input system also includes a multimodal integration system to receive and integrates the voice signal and the control signal. The multimodal integration system delimits a context of a spoken utterance of the voice signal by using the control signal to preprocess and discretize into phonetic frames. A voice recognizer analyzing the voice signal integrated with the control signal to output a voice recognition result. This new paradigm helps overcome constraints found in interfacing mobile devices. Context information facilitates the handling of the commands in the application environment.

30 Claims, 6 Drawing Sheets

| Chinese Characters | Shapes of stroking on touchpad or touch-screen |
|---|---|
| 媽/妈(mā) "mother"<br>—high level |  |
| 麻(má) "hemp" or "torpid"<br>—high rising |  |
| 馬/马(mǎ) "horse"<br>—low falling-rising |  |
| 罵/骂(mà) "scold"<br>—high falling |  |
| 嗎/吗(ma) "question particle"<br>—neutral |  |

MULTIMODAL UNIFICATION OF ARTICULATION FOR DEVICE INTERFACING

CROSS-REFERENCE TO RELATED APPLICATIONS AND CLAIM OF PRIORITY

This application claims the benefit of U.S. Provisional Patent Application Ser. No. 61/136,502, filed Sep. 10, 2008, which application is hereby incorporated herein by reference in its entirety.

BACKGROUND OF THE INVENTION

1. Field of the Invention

The present invention relates to a voice based multimodal input system with interactive context adjustments via explicit mediation, and more particularly, to a software-driven voice based multimodal input system with interactive context adjustments via control signals.

2. Description of the Related Art

Most prevalent and natural means of interactive communication is through the spoken language. Especially, for communication in real time, since there is no temporal gap, there is no need for storage, and there is no need for conversion into written language. This realtime-ness is a constraint and an advantage at the same time. The use of voice signals is not nearly as prevalent in interfacing computers or electronic devices. When applying this natural mode of interactive communication to human machine interface, the interactiveness can be leveraged. In other words, other kinds of interactive input modalities can be integrated to mediate the voice processing process. Research in cognitive science confirms that human brain also rely on integrating cues from plurality of sensing modalities to recognize speech. This is referred to as the McGurk effect.

Here, we classify conventional arts in integration and mediation schemes for voice recognition, as depicted in FIG. 1. Interactively mediating 110 voice recognition can be done either at pre-processing stage 112 or post-processing stage 111. Most existing voice recognition systems used in computers do have interactive interface to confirm the results processed by the recognition module, which occurs in the post-processing stage. U.S. Pat. No. 4,829,576, issued May 9, 1989, to Edward W. Porter, discloses a menu driven interface 117 for post-process confirmation. For pre-processing stage mediation 112, there is either hardware-driven mediation 113 or software-driven mediation 114. A hardware-driven pre-processing mediation 113 is disclosed in the aforementioned U.S. Pat. No. 4,829,576: a hardware switch 118 to convert between dictation mode and command mode. For software-driven mediation 114 at pre-processing stage, further division exists; between implicit 115 and explicit 116. Explicit software-driven mediation 116 at pre-processing stage provides explicit information, such as speech period start and termination point, or referent target of the command. Aforementioned U.S. Pat. No. 4,829,576 discloses a method of using voice signal amplitude 122 to determine speech period start and termination point. Alternatively, U.S. Pat. No. 5,884,257, issued Mar. 16, 1999, to Idetsugu Maekawa et al, discloses a method of using lip image processing 123 to determine speech period start point and termination point. U.S. Pat. No. 6,990,639 B2, issued Jan. 24, 2006, to Andrew Wilson, discloses integration of a pointing device 124 to determine which component a user wants to control and what control action is desired. In above three patents, mediation of the voice recognition occurs with an explicit input, such as lip movements or pointing device motions. For the 'implicit' software-driven mediation 115 (at pre-processing stage), number of prior arts exists as well. Implicit software-driven mediation 115 at pre-processing stage can aid in context determination, for more efficient recognition. U.S. Pat. No. 5,615,296, issued Mar. 25, 1997, to Vincent M. Stanford et al, discloses software based algorithm to implicitly perform high-speed context switching 119 to modify the active vocabulary. Also, U.S. Pat. No. 5,526,463, issued Apr. 9, 1993, to Laurence S. Gillick et al, discloses a software algorithm to use beginning part of speech to pre-filter 120 the set of vocabulary to match against. Finally, U.S. Pat. No. 5,677,991, issued Oct. 14, 1997, to Dong Hsu et al, discloses arbitration algorithm 121 to mediate between "large vocabulary isolated word speech recognition (ISR) module" and "small vocabulary continuous speech recognition (CSR) module." All three patents above implicitly infer cues embedded in speech without explicit user input. All three of the implicit software-driven mediation 115 at pre-processing stage, by design, increases recognition accuracy while reducing computation. This is not always the case with integration schemes for multiple sensing modalities. Aforementioned U.S. Pat. No. 6,990,639 B2 124 provides means of augmenting context information at a cost of increased computation; this patent, with the combined use of pointing device and voice input, augments voice commands with the referent or the target of the command, as a form of context information. Increased computational cost is due to independent processing of voice inputs and the pointing device inputs. Another such example is U.S. Pat. No. 6,499,025 B1, issued Dec. 24, 2002, to Eric J. Horvitz, which discloses methodology of integrating multiple sensing modalities. With each added sensing modality, Bayesian inference engine 126 is added, and computation is increased proportionately.

However, each one of these references suffers from one or more of the disadvantages. Therefore, development of more efficient system with an increased accuracy and without increasing computation is required.

The above information disclosed in this Background section is only for enhancement of understanding of the background of the invention and therefore it may contain information that does not form the prior art that is already known in this country to a person of ordinary skill in the art.

SUMMARY OF THE INVENTION

It is an object of the present invention to provide a system for multimodal unification of articulation for device interfacing.

It is another object of the present invention to provide interactive continuous voice based phonetic human machine interface.

It is another objective to provide methodology to augment continuous voice signal with discrete control signals.

It is another objective to use this multimodal integration scheme to preprocess and discretize into phonetic frames.

It is another object of the invention to provide an efficient continuous voice based phonetic input system having a large vocabulary with a minimum memory and processing requirement.

A still further object of the present invention is to recognize commands and the augmented context information.

According to an aspect of the present invention, a system for a multimodal unification of articulation includes a voice signal modality receiving a voice signal, a control signal modality receiving an input from a user while the voice signal is being inputted and generating a control signal from the input, the input selected from predetermined inputs directly corresponding to the phonetic information to make the control signal carry phonetic information of the voice signal, and a multimodal integration system receiving and integrating the voice signal and the control signal, the multimodal integration system including an inference engine to delimit a context of a spoken utterance of the voice signal by discretizing the voice signal into phonetic frames, the inference engine analyzing the discretized voice signal integrated with the control signal to output a recognition result.

According to an aspect of the present invention, the voice signal includes a signal of a continuous speech, and the inference engine includes a continuous speech recognizer.

According to an aspect of the present invention, the voice signal includes a signal of an isolated word speech, and the inference engine includes an isolated word speech recognizer.

According to an aspect of the present invention, the voice signal modality includes at least one selected from the group consisting of a microphone, an artificial voice generator, and a combination thereof.

According to an aspect of the present invention, the control signal modality includes at least one selected from the group consisting of a keyboard, a mouse, a touchscreen, a wireless pointing device, eye-tracking device, brain-machine interface, and a combination thereof.

According to an aspect of the present invention, the system further includes a non-invasive on-screen dialog manager interface to be displayed for touch and/or pen based control signal input.

According to an aspect of the present invention, the input from the user includes at least one selected from the group consisting of pressing a predetermined key of the keyboard, tapping the touchscreen in a predetermined pattern at a predetermined area of the touchscreen, stroking the touchscreen with a predetermined pattern at a predetermined area of the touchscreen, and moving the mouse with a predetermined pattern.

According to an aspect of the present invention, the control signal modality is a touchscreen, and the input from the user is generated by at least one of the user's tapping and stroking on the touchscreen respectively for each syllable or word spoken by the user, on a predetermined area with a predetermined number of fingers.

According to an aspect of the present invention, the system further includes an analog-to-digital conversion module converting the voice signal into quantized input stream and a spectral feature extraction module transforming the quantized input stream into frames of vectors.

According to an aspect of the present invention, the inference engine includes an acoustic model mapping the frames of vectors into internal phonetic representation, a language model, and a dialog manager working with the language model for determining how the utterance is interpreted.

According to an aspect of the present invention, the input further includes a context information for at least one of the dialog manager and the language model, the context information indicating at least one selected from the group consisting of which language is used, whether utterance should be executed or transcribed, and whether the voice signal is related to a punctuation symbol, a programming language token, or a phrase from a predetermined vocabulary subset.

According to an aspect of the present invention, the control signal facilitates inference in the acoustic model, from ambiguities in at least one selected from the group consisting of allophones, syllable boundaries, word boundaries, prosodies, and intonations.

According to an aspect of the present invention, the inference engine tolerates misalignments in the control signal.

According to an aspect of the present invention, the control signal facilitates inference in the language model, from ambiguities from homonym.

According to an aspect of the present invention, the control signal facilitates interpretation of a command in the dialog manager.

According to an aspect of the present invention, glottal pulse generation control also serves as control signal and vice versa.

According to an aspect of the present invention, the system further including a confirmatory processing to confirm the partial results of n-best candidates from the inference engine executing concurrently while receiving input.

According to an aspect of the present invention, a portable device having the system for the multimodal unification of articulation.

According to an aspect of the present invention, a navigation system having the system for the multimodal unification of articulation.

According to an aspect of the present invention, a method for performing a multimodal unification of articulation, including receiving a voice signal, receiving an input from a user while the voice signal is being received, the input selected from predetermined inputs directly corresponding to phonetic information, generating a control signal generated by the input from the user, the input selected from predetermined inputs directly corresponding to the phonetic information to make the control signal carry phonetic information of the voice signal, integrating the voice signal and the control signal, discretizing the voice signal into phonetic frames to delimit a context of a spoken utterance of the voice signal, and analyzing the discretized voice signal integrated with the control signal to output a recognition result.

According to an aspect of the present invention, the voice signal is related to Chinese or Japanese language, and the integration of the voice signal and the control signal includes preprocessing and discretizing into phonetic frames without performing an artificial Romanization.

According to an aspect of the present invention, the input further includes an input of touching a touchscreen with a predetermined shape corresponding to tone levels of Chinese.

DETAILED DESCRIPTION OF EMBODIMENTS

Figure 1:
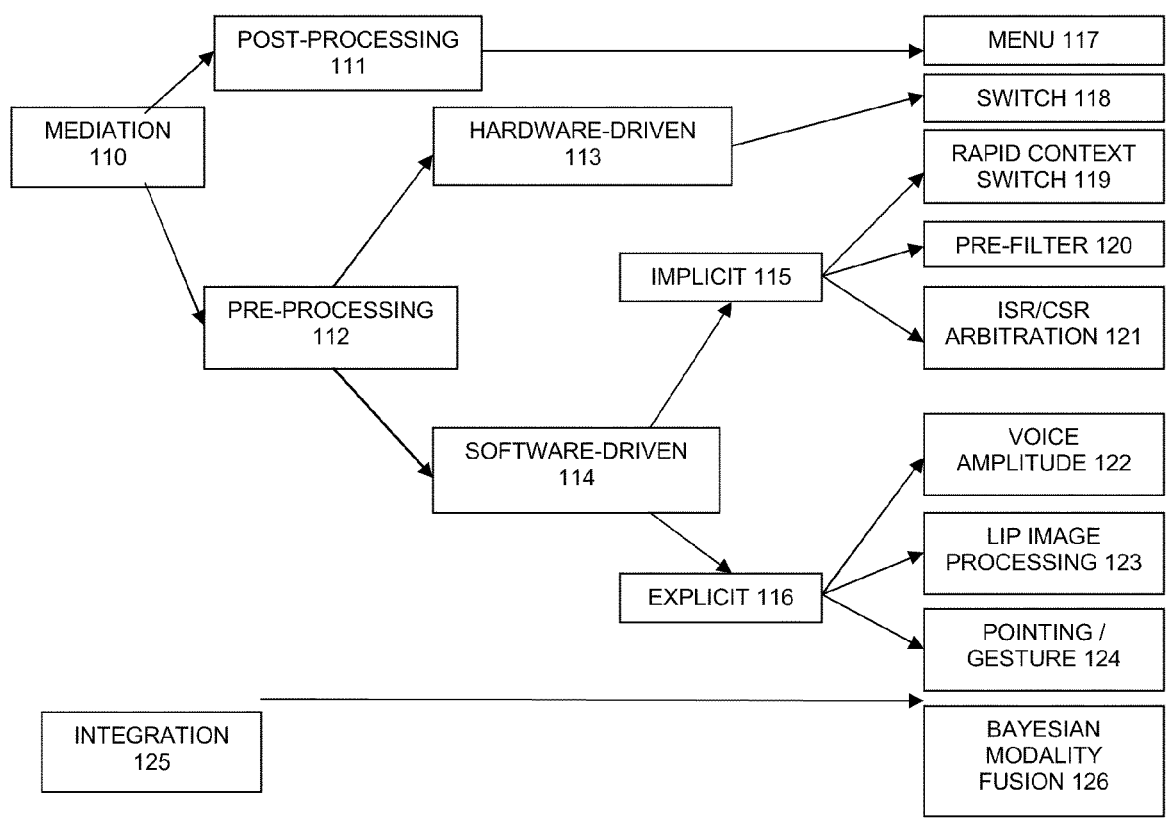
FIG. 1 is a diagram illustrating the classification of related prior arts.

The foregoing and still further features and advantages of the present invention as well as a more complete understanding thereof will be made apparent from a study of the following description in connection with the accompanying drawings.

In the following description of the invention, reference may be made to the accompanying drawings, which form a part hereof, and in which is shown by way of illustration a specific example in which the invention may be practiced. It is to be understood that other embodiments may be utilized and structural changes may be made without departing from the scope of the present invention.

Control signal is defined as a complementary stream of information that aids in decoding of voice stream. This may include gestures, keyboard input, pointing device input, multi-touch screen input, eye-tracking device input, brain machine interface input, etc.

In everyday conversation, gestures and body language help in comprehension. For example, pointing to an object during a conversation may help disambiguate which object is referenced. This pointing gesture helps in comprehension, but does not help the listener to hear better. Furthermore, the pointing gesture used in the conventional art is not related to phonetic information. The phonetic information is concerned with the physical properties of speech sounds (phones), the semantic information is concerned with the meaning The object of merging control signal according to an embodiment of the present invention is to improve the decoding of voice-based input at an acoustic and phonetic level, as well as semantic level.

Additionally, control signal modality is chosen to facilitate discretization of the voice-based input. More specifically, complete ASR (Automatic Speech Recognition) would require computers to reach Turing-complete level of sophistication. Using sign language in place of spoken language does not improve the situation. However, virtually all modern day digital devices are interfaced through hand motion, without ever achieving sophistication of gesture or sign language comprehension. This is made possible because hand motion is discretized into keyboard input or pointing device input. With the help of this discretization trick, voice-based input can also used in this manner to control devices, without reaching complete ASR.

According to an embodiment of the present invention, combining multiple modalities of articulation makes possible device interfacing.

We describe the source of difficulty in SRS (Speech Recognition Systems) in the conventional art.

Unlike the discretized input modality such as keyboard or pointing device, inference engine decodes the voice-based input. This inference takes place at multiple levels: 1. end-point determination, 2. word segmentation, 3. word inference, 4. phonetic inference. First, major complication in interactive SRS is in starting and stopping the input device. Solution in the conventional art involves the use of an automatic energy-based speech/silence detector to infer sentence beginning and ending. Secondly, word boundaries are inferred. For example "ice cream" shares same phonetic representation with "I scream" and "eyes cream". Third, homonyms must be disambiguated from the context, such as a language model. Fourth and last, inconsistencies in phonetic representation of word are also inferred. If two phonemes have the same identity but different left or right contexts, they are considered different triphones. The plurality of realizations of a phoneme are called "allophones". Inconsistent realizations of allophones are due to coarticulation and juncture effect on word boundaries, especially with short function words like the or a. Even with the same left and right context identities, there may be significantly different realizations for a phone at different word positions, which makes rule based LTS (letter-to-sound) system impossible. For example, the word "because" has more than 15 different pronunciation variations. Solution to word boundaries and phonetic inference usually involves inference engine trained on tri-phones and sub-phone models. Frequently, inference engine double duties as segmentation and decoding engine. Complication is compounded from each source of ambiguity.

Even for languages with good LTS, difficulty arises due to inadequate representation of the temporal structure of speech in most inference engines. There are only 50 syllables in Japanese, however prosody makes phonetically similar sequence difficult to distinguish. For example, "koko" means here, but "ko-ko" can be one of 8 different words, and "koko-" has 9 different semantic mappings, and finaly "ko-ko-" 22. Chinese, as well, has only 56 basic sounds, according to Pinyin transliteration methodology. When accounted for all combinations, the number of possibilities becomes 413. But due to intonation, the actual number of unique syllables is around 1600. For example, the same sound "ma" and have five different tones, each semantically different. As with the problem with coarticulation intonation does not follow a strict rule, and requires inference. If word segmentation and LTS were the source of ambiguities for English, prosody complicates inference for Japanese, and intonation for Chinese.

The solution provided by one or more embodiments of the present invention is to combine articulations of voice based input modality and other input modalities to facilitate the inference. By way of example and not limitation, touch screen interface can help mark word boundaries for English based commands. Fast context switching can also be provided between English based command and non-English command, such as punctuation mark, application specific commands, etc. By way of example and not limitation, morse code like tap can make explicit syllable boundaries and prosody for Japanese based command. By way of example and not limitation, stroke-based input can explicitly indicate intonation and syllable boundaries for Chinese based command. This makes machines not only understand better, but also hear better.

An embodiment of the present invention makes use of the McGurk effect equivalent in computational inference. For us humans, visual cues such as lip movements and facial expressions not only help in inferring meaning but also aid in extracting phonetic and acoustic features, unconsciously, at a cognitive level. In the same vein, an embodiment of the present invention makes use of control signals and unify articulations of voice modality with other modalities to infer phonetic and acoustic features as well as semantic features.

By discretization, we refer to the process of making implicitly embedded information explicit. Discretization results in reduction of dimension in solution space, which may be in code domain or time domain. By means of example and not limitation, segmenting time series of feature vectors into a sequence of phonemes results in reduction of dimension in both time and code domain. By means of example and not limitation, grouping a sequence of phonemes into sequence of syllables results in results in reduction of dimension in time domain. By means of example and not limitation, deriving the intonation of each syllable results in making embedded information explicit.

Figure 2:
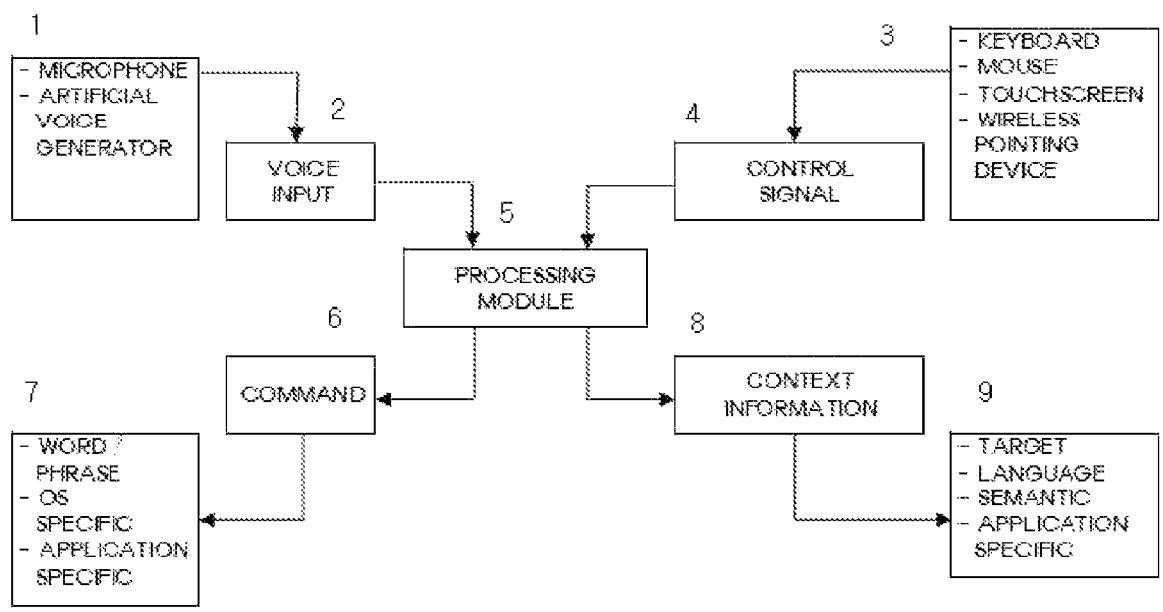
FIG. 2 is a high level functional overview of an embodiment of the present invention.

An embodiment of the present invention will be described in the general context of computer-executable instructions 5, such as program modules, being executed by computer, as shown in FIG. 2. Generally program modules include routines, programs, objects, components, data structures, etc. that perform particular tasks or implement particular abstract data types.

Flow of input and output from the system is described in FIG. 2. Voice-based input 2 may come from a voice modality 1 such as microphone directly attached to the machine, digitized voice stream from telephony system, or IP phone system. Voice-based input 2 may also come from non-audible artificial speech generator, as disclosed in U.S. Pat. No. 4,821,326, issued Apr. 11, 1989, to Norman MacLeod, which is incorporated herein by reference. Control signal 4 may come from any source of input modality 3, including keyboard, pointing device, multi-touch screen, brain-machine interface, etc. Resulting output, though application specific, can be specified in two categories. Command output 6 may include actual word, phrase, sentence, command, and other specific instruction. Context information output 8 may include other information that direct the interpretation and flow of the command output 7.

Figure 3:
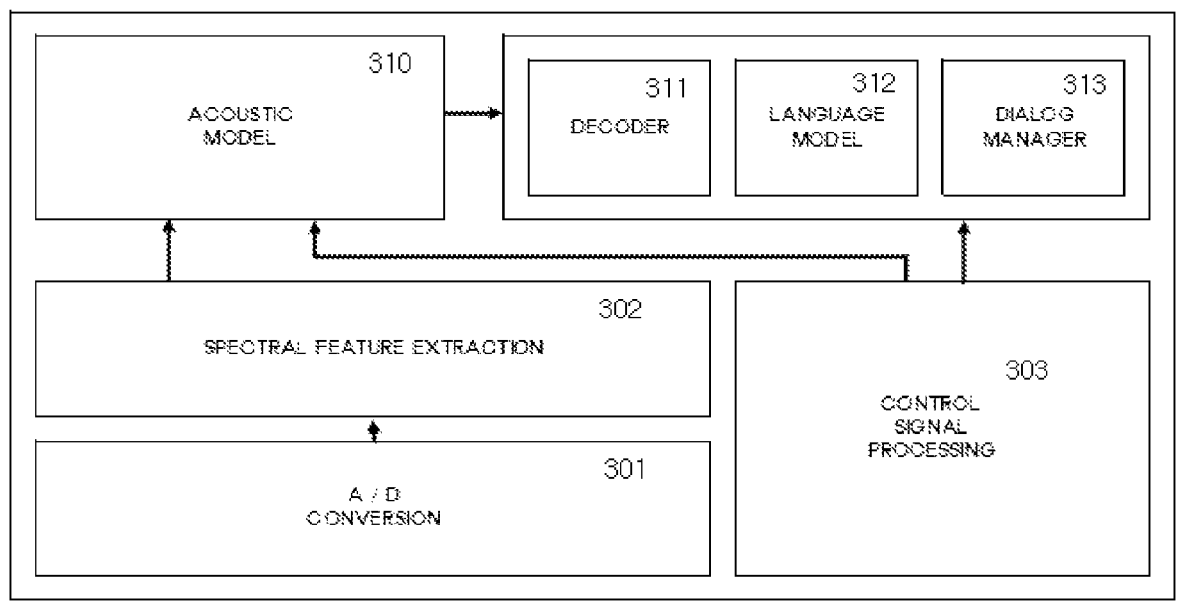
FIG. 3 shows components of a processing module according to an embodiment of the present invention.

Components of the processing module 5 which is an inference engine according to an embodiment of the present invention is described in FIG. 3. A/D conversion module 301 converts voice-based input into quantized input stream. Spectral feature extraction module 302 transforms quantized input stream into frames of vectors. Preprocessing can be done to transform the input into a new space that alleviates environment noise, channel distortion, and speaker variations. Most commonly used features are MFCCs (Mel-Frequency Cepstral Coefficients) or PLP (Perceptual Linear Prediction). Control signal processing module 303 discretizes control signal for inference. Most SREs (Speech Recognition Engine) use HMM (Hidden Markov Model). It is common in the practice to augment feature vector with additional data such as first and second difference coefficients and/or log energy level. Control signal can be incorporated into the acoustic model by extending existing HMM as a feature vector augmentation, or use other inference engine to merge with HMM. More recent methodology for segmentation and inference uses MEMM (Maximum Entropy Markov Model) or CRF (Conditional Random Field). Acoustic model module 310 maps frames of vectors into internal phonetic representation. Number of models exists to map features to phonetic representation, including Gaussian, mixture, and MLP (Multi-layer perception). Phonetic representation is often not phoneme-based, but rather modeled with tri-phones or sub-phoneme. Decoder module 311 handles the inference. Language model module 312 and Dialog manager module 313 work closely with the decoder module 311. Language model, also called grammar, models the structural relation between words, which is used as prior probability in the decoding. Dialog manager in Telephony applications (IVR—interactive voice response), and in some desktop Command and Control Applications, assigns meaning to the words recognized by the SRE, determines how the utterance fits into the dialog spoken so far, and decides what to do next. In a Dictation application, dialog manager determines how the utterance is transcribed—for example, whether the utterance "period" represents the literal word or the punctuation park. Likewise, dialog manager module 313 according to an embodiment of the present invention provides context to the inference, causing the dictionary to change or how the command is interpreted during the decoding. For the actual decoding with HMM, Viterbi, or its derivatives such as "beam search" can be used. Multi-pass decoding or A* decoding are also possible. Result of decoding may be reduced to n-best possibilities. If confirmatory control signal is received during decoding, it positively influence the consequent decoding process, due to added context information.

Decoding involves all the components working concurrently in the embodiment of the present invention. As is depicted in FIG. 3, control signal processing 303 feeds into acoustic model 310 and also a compound of decoder 311, language model 312 and dialog manager 313. Control signal interactively and dynamically directs the decoding, in mid-process.

Figure 4:
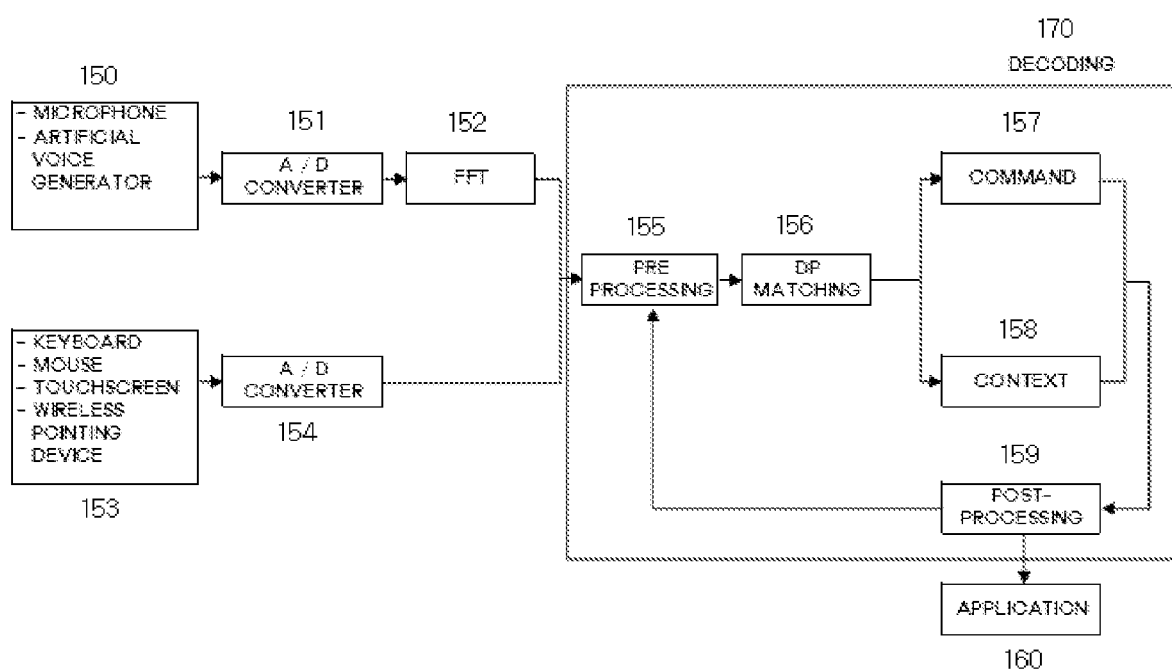
FIG. 4 is a block diagram of a voice recognition and control signal integration system in accordance with an embodiment of the present invention.

Procedural steps are depicted again in FIG. 4 with more elaboration on pre-processing and post-processing. Briefly, voice-based input 150 is digitized in an analogue-to-digital (A/D) converter 151, and spectral feature is extracted through a fast Fourier transform operation unit (FFT) 152. Concurrently, control signal input 153 is digitized in an analogue-to-digital (A/D) converter 154. Decoding 170 is a compound process made up of pre-processing 155, dynamic programming (DP) matching 156 and post-processing 159. We use the term DP matching 156 in a general sense, synonymous with Viterbi based algorithm, such as beam search, although the terms DP alignment (for Dynamic Programming alignment), dynamic time warping, and one-pass decoding are also commonly used. As mentioned before, other inference algorithms such as MEMM or CRF can be used in conjunction.

As for the confirmatory process in post-processing 159, this is best exemplified by the current implementation of Japanese and Chinese entry system. For a keyboard based entry in the conventional art, Japanese and Chinese entry goes through confirmatory processing. To enter Japanese into computer in the conventional art, Romanized transliteration step is required. Alphabetic keyboard entry maps to Japanese phonetic representation called Hiragana, made up of 46 characters. At each word breaks, phonetic representation is converted into semantic representation based on Chinese characters called Kanji, which range between 2,000 and 4,000 characters. During the conversion process, computer suggests n-best possibilities, and the user then selects and confirms the choice. Keyboard based entry system for Chinese has adopted a similar scheme of phonetic Romanization called Pinyin. Romanized transliteration of Chinese and Japanese languages are merely social convention, as much as Dvorak/Qwerty keyboard layout. An embodiment of the present invention may share the confirmatory processing for disambiguation, but the embodiment of this invention presents an alternative to keyboard-based Romanized transliteration step. As stated above, converting speech into written form of language is unnecessary for interactive communication according to an embodiment of the present invention.

We draw another example to describe the post-processing 159. Query box on the internet sites such as Google or Amazon displays n-best candidates as the query is entered. In mid-process, if desired entry is selected and confirmed, decoding can be greatly simplified and even terminate without requiring full entry. Thus, post-processing does not wait for completion of entry (voice-based input and control signal input). SREs in implementation wait for the end of utterance for post-processing, to receive confirmation among n-best candidates. Post-processing 159 is executed concurrently with pre-processing 155. Post-processing 159 mediates pre-processing 155. With each confirmed data, decoding prunes unlikely branches. As stated before, through the control signal, decoding is mediated interactively and dynamically, in mid-process. In most SRE pre-processing 155 and post-processing 159 are executed sequentially. The terms are retained here to draw attention to the functional roles. But post-processing 159 in this patent application runs concurrently in multi-threaded configuration, and as depicted in FIG. 4, directs the flow of decoding in pre-processing 155.

Having described the interspersed and interactive aspects of the mediation, we clarify the nature of mediation. Unlike other gesture or eye-tracking based modalities, mediation occurs at multiple levels, not limited to semantic interpretation. Mediation can aid inference through acoustic model 310, language model 312, and/or dialog manager 313.

In relation to the classification described in FIG. 1, pre-processing of input streams in this system falls most closely under explicit software-driven mediation 116. We elaborate on "explicit-ness" and "software driven-ness" and also why this patent does not exactly fall exactly into a specific category. Inference is mediated "explicitly" through the control signal. Unlike hardware-driven mediation, software-driven mediation, as presented in this invention, may allow for slight misalignment of the control signal. Prosody or segmentation misalignment correction takes place in the acoustic model 310, which may be implemented in the sub-phoneme model. Inference engine is designed to adjust for degradation in signal quality, as this misalignment. Due to reliance in the inference engine, there is some "implicit-ness" in our mediation process. However, unlike automatic energy-level based segmentation, inter-energy-level segmentation is "explicitly" possible. Mediation takes place in the "software" components, namely the acoustic model 310, language model 312, and dialog manager 313. But the control signal itself does rely on "hardware" input such as keyboard, pointing device, eye-tracking device, multi-touch screen, or brain-machine interface.

Figure 5:
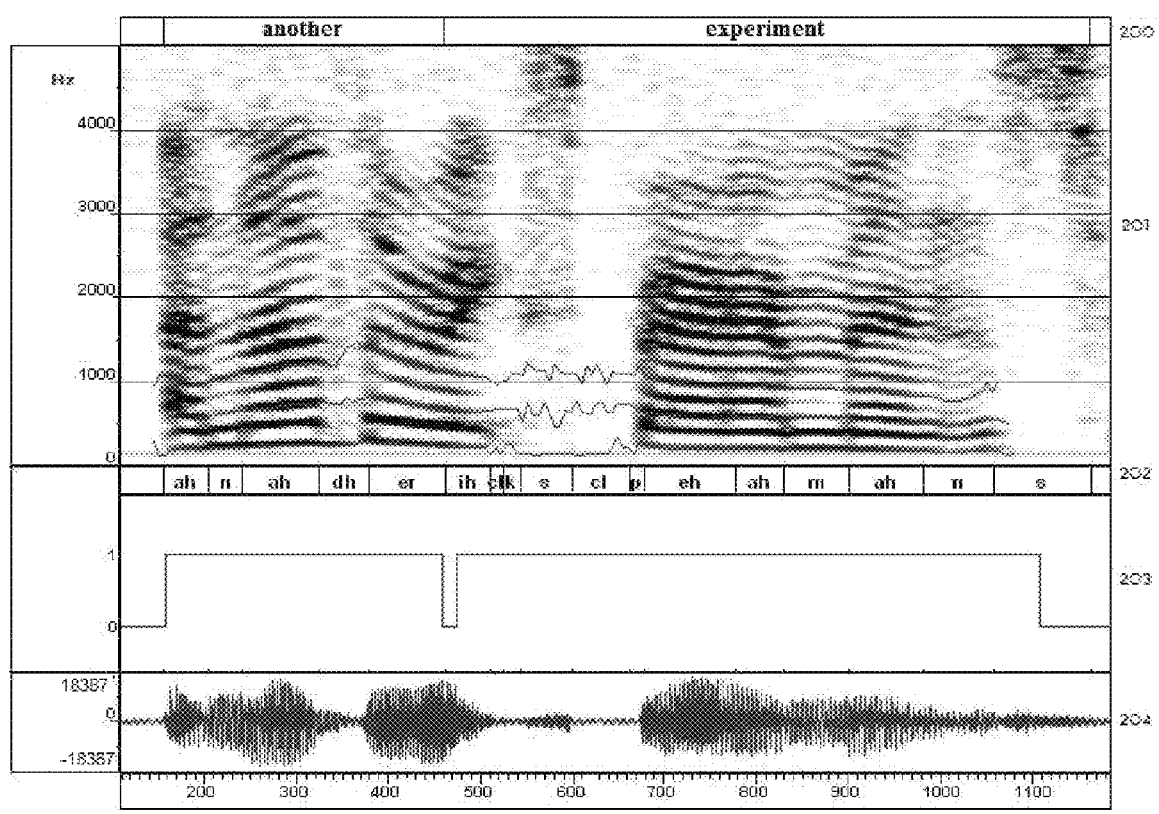
FIG. 5 is an illustrative snapshot of the software component in action which depicts internal processing of the voice input and the control signal.

FIG. 5 depicts a simplified case of a binary control signal, to illustrate the procedure of using control signal to infer word boundaries. In the integration scheme, it is the control signal that carries the context information. By way of example, and not limitation, control signal can be embedded by changing which key is pressed, or by changing which area of the touch-screen is tapped. Again, by way of example, and not limitation, such context information can indicate whether spoken word should be interpreted as an English word, a punctuation symbol, a programming language token, or a phrase from a predetermined vocabulary subset. These settings are very application specific and user specific, hence left for programmatic customization, and software-training based on computational methods. With identified phonemes 202, along with word boundaries and context information delimited by the control signal 203, computation is greatly reduced by pruning unnecessary branches off of the dynamic programming calculation.

Also of note is the deliberate choice of the kinds of control signal modalities, which has direct implications in the efficiency gains. Having the direct implications means that the control signal itself directly corresponds to, for example, the phonetic information such as word boundaries and does not require inference engine that requires computation. Conventional multimodal integration scheme involves fusion of inputs where each of which require processing, and where inputs themselves have little synergy. The integration scheme according to an embodiment of the present invention is to maximize the synergy through coupling voice input, that require processing, with control signal which require close to no processing i.e., computational resources or power usage. Context switching and pre-filtering executes through explicit control signal, without an inference engine that requires computation. Not only is there no incursion of proportionately increased computational requirement, but the overall synergy reduces computation below that of the computation required solely by continuous voice recognition system alone. This allows real time processing possible, especially for application in the mobile devices, where processing constraints and battery limits are critical.

Hereinafter, the present invention will be described in more detail by presenting the following examples. The examples are for illustrative purpose, and are not intended to limit the scope of the present invention.

EXAMPLE 1

A voice recognition system according to Example 1 of the present invention will be described. In accordance with the system of the present example, processing module is embodied as a software, more precisely as an interface to the operating system. Operating environment can be implemented in variety of computer system configurations, including personal computers, server computers, hand-held devices, multiprocessor systems, microprocessor-based or programmable consumer electronics, networked PCs, minicomputers, mainframe computers, mobile phones, navigation systems and the like. According to an embodiment of the present invention, operating environment is a personal computer with a multi-point touch-screen. Voice input is received through a wireless or wired headset. Control signal is preferably received through the touch-screen, or keyboard/mouse if necessary. In the case of touch-screen or tablet PC, a floating interface is displayed for touch and/or pen based control signal input. To allow smooth operations of the active application, floating interface can be adjusted by dragging, resizing, or adjusting the transparency-level. The floating interface can also display feedback information, such as received phonemes and/or words. The floating interface can also receive confirmatory (post-processing) input, determining whether the command was correctly recognized. Other specifics of how the voice input should be interpreted, i.e. the context information configuration, can be customized through the operating system setup. By way of example, and not limitation, generic setup can divide the floating interface into command, dictation, and symbols area. For example, user can speak through the headset a certain command, such as "open file" while rhythmically tapping the command area with each word. This would be recognized by the operating system to open a file for the currently active application. In contrast, if the tapping of the screen occurred on the dictation area, the same utterance "open file" would have inserted the text verbatim into the active application. Therefore, utterance "open parenthesis" can be interpreted as the words themselves or the ASCII character "(" depending on which area of the floating interface is tapped. Beyond the most generic usage, in order to interface a complex application such as an IDE, or a code editor, intricate interface for rapid context switching can be devised. Following the multi-tier Model-View-Control software architecture, the view layer (the floating interface), can be made completely user configurable with open API's. The core of the software, the model layer, provides the language model and the semantic model. In between the interface and the core layer is the control layer, which encompasses phonetic model and context-vocabulary model. Much of the algorithm is using an inference engine to match word boundaries and using DP to match phoneme sequence with context specific vocabulary set. Language model and semantic model post-processes recognized tokens into semantically coherent command and context.

EXAMPLE 2

In accordance with a voice recognition system of Example 2, voice input signal is generated through a non-audible speech, such as whispering or unvoiced lip motion. A large number of applications exist for non-audible voice recognition interface, such as in surveillance operations, military operations, or even where a person simply wishes to not be overheard while speaking in a public setting. Likewise, there are a number of situations in which surrounding or background noise is so great, that common levels of conversation or even high amplitude speech cannot be heard, such as at airport, on the battlefield, or in industrial environments. Finally, there are a number of applications, where audible speech itself, although desired, may be too awkward or distracting, such as in the case of dictation, or in a library.

There are number of ways to implement non-audible voice recognition interface. U.S. Pat. No. 5,884,257 which is incorporated herein by reference discloses a methodology for lip reading. Another approach, taken by the artificial speech generator as disclosed in U.S. Pat. No. 4,821,326 which is incorporated herein by reference, is more applicable to non-audible voice-recognition interface. Aforementioned patent discloses a means of generating non-audible artificial speech through ultrasonic glottal pulse generation. As oral motion silently mouths the words, ultrasonic glottal pulse is shaped and received by the ultrasonic detector. The returned ultrasonic signals can be used for non-audible voice recognition, thus enabling control over the computing environment with oral motion. In this usage, although artificially generated speech is not intended for human listener, returned ultrasonic signals can be converted to audible frequency range, and can be privately transmitted through headphones, for feedback purposes.

For tonal languages such as Chinese or Thai, tone generation requires further considerations in artificial speech generation. Solely with phonemes, homonyms make recognition difficult. The modality of control signal can be chosen to maximize the synergy, while satisfying the required constraints.

Figure 6:
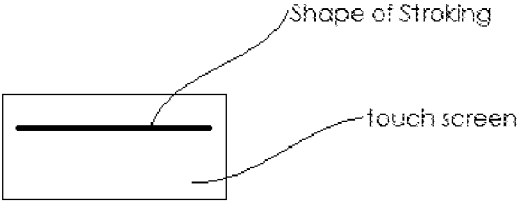
FIG. 6 illustrates an example of the tones in Chinese and predetermined shapes on the touch screen, corresponding to the tones.
Figure 6:
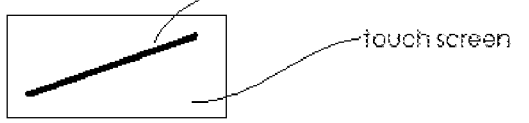
Figure 6:
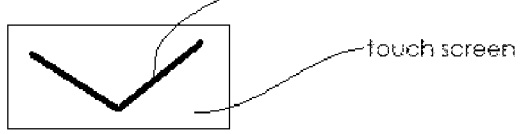
Figure 6:
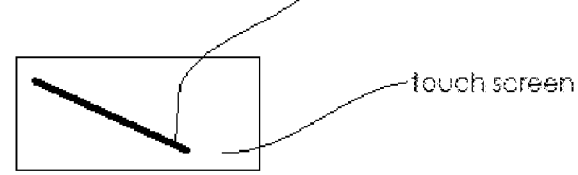
Figure 6:
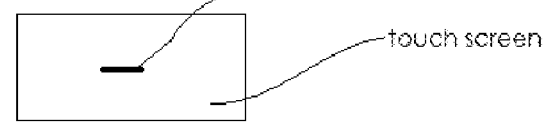

An example of the use of tones in Chinese is shown in FIG. 6. FIG. 6 shows the four main tones of Standard Mandarin applied to the syllable "ma". For example, while a user is speaking "ma", the user can indicate tone levels by making a predetermined shapes on the touch screen. This helps recognizing the tone level and help delimit the context of the spoken utterance even in the continuous voice recognition process as well as the isolated word speech recognition process.

By way of example, and not limitation, for a non-audible voice recognition system, using Chinese, tone levels can be indicated by stroking gestures on the touchpad or a touch-screen. With each unvoiced lip motion of the character, touchpad or touch-screen is stroked to indicate one of five possible variations in the tone (this is specific to the Chinese language). As stated above, the choice of discrete control signal enables performance gain; hence tone variation is simplified and discretized to five possibilities, which is sufficient in the case of the Chinese language. A headphone can provide private feedback through an artificially generated voice, to confirm the phoneme and the intonation. In artificial speech generation, explicit control starts and ends pulse generation. This can be handled through the same gesture used to indicate intonation; one stroking gestures starts and ends pulse generation, and also determine the intonation. Thus, the touchpad or touch-screen stroke doubles as control signal for tone and also as control signal for character delimitation. Encryption and security measures can be improved by scrambling the frequency of the ultrasonic glottal pulses. Since there are lots of ambiguities in determining Chinese character with just phoneme and tone, post-processing may be required to infer semantic context, and also provide an interface to confirm among possible candidates. Basic principle of the operation and efficiency gain remains the same—integration with explicit control signal.

EXAMPLE 3

Next, a voice recognition system in Example 3 of the invention will be described. In this example, a voice recognition system is implemented on a mobile device with a headset. Numeric pads or keyboard do not work well in a mobile setting. Walking and typing, though feasible, is not realistic for everyday use. Voice recognition systems available to mobile devices can be improved without sacrificing battery power or size constraints associated with more processing power. By way of example, and not limitation, spoken languages with clear syllable delimitation such as Korean or Japanese can be recognized with ease in the scheme provided by the current invention. For a mobile device with a touch-screen, a tap for each syllable and scrub for space is enough to improve the recognition capability to an acceptable level. This Morse-code like tap and scrub does not sacrifice much in the way of mobility either. In Korean and language, allophones do exists, so there is a need for minor post-processing with a semantic engine. In Japanese language, white space do not exists, and furthermore there are significant ambiguities due to homonyms. However, as already widely available through mobile phones through short text messaging, just about all mobile phones in Japan already have a fairly robust language engine, or at least a string matching algorithm. Although the language engine can suggest likely candidates based on semantics and usage frequency, user confirmation is necessary, per each phrase in the worst case. Again, the principle remains the same, with some variable gains in efficiency, depending on the language.

The present invention is directed toward a system and process that controls a computer or an electronic device such as a handheld PDA or mobile phone using a multimodal integration scheme in which voice based input and control signals from plurality of user communication modalities are combined to enable user to interactively mediate the command inference process. Voice based input and control signals are processed together to produce a sequence of commands and context information. Commands may be, but not limited to, words or phrases. Intended usage, however, is designed to encompass scope larger than dictation or simple replacement for keyboards. Modern computing environment multi-tasks over several applications, each with a complex interface of its own. Under the window and GUI paradigm, pointing device and keyboard based input has remained dominant. The novel integration approach in this patent, with the use of voice input, provides independent means of interfacing the computing environment in entirety, not as a substitute for one aspect of the interface. Furthermore, this new paradigm helps overcome constraints found in interfacing mobile devices. Context information facilitates the handling of the commands in the application environment. Context information may be, but not limited to, information regarding target of the voice commands, language of the spoken command, history of the previously accepted commands, and other application specific details. Furthermore, synergy is sought in the integration scheme, which leverages control signals as cues for facilitating the pre-processing of the voice signal.

As various changes could be made in the above constructions without departing from the scope of the invention, it should be understood that all matter contained in the above description or shown in the accompanying drawings shall be interpreted as illustrative and not in a limiting sense.

What is claimed is:

1. A system for a multimodal unification of articulation, comprising:
   a voice signal modality receiving a voice signal;
   a control signal modality receiving an input from a user while the voice signal is being inputted, the control signal modality generating a control signal from the input, the input selected from predetermined inputs to help decipher ambiguities arising from syllable boundary, word boundary, homonym, prosody, or intonation; and
   a multimodal integration system receiving and integrating the voice signal and the control signal, the multimodal integration system comprising an inference engine to delimit a context of a spoken utterance of the voice signal by discretizing the voice signal into phonetic frames, the inference engine analyzing the discretized voice signal integrated with the control signal to output a recognition result.

2. The system of claim 1, wherein the voice signal comprises a signal of a continuous speech, and the inference engine comprises a continuous speech recognizer.

3. The system of claim 1, wherein the voice signal comprises a signal of an isolated word speech, and the inference engine comprises an isolated word speech recognizer.

4. The system of claim 1, wherein the voice signal modality comprises at least one selected from the group consisting of a microphone, an artificial voice generator, and a combination thereof.

5. The system of claim 1, wherein the control signal modality comprises at least one selected from the group consisting of a keyboard, a mouse, a touchscreen, a wireless pointing device, an eye-tracking device, a brain-machine interface, and a combination thereof.

6. The system of claim 5, further comprising a non-invasive on-screen dialog manager interface to be displayed for touch and/or pen based control signal input.

7. The system of claim 5, wherein the input from the user comprises at least one selected from the group consisting of pressing a predetermined key of the keyboard, tapping the touchscreen in a predetermined pattern at a predetermined area of the touchscreen, stroking the touchscreen with a predetermined pattern at a predetermined area of the touchscreen, and moving the mouse with a predetermined pattern.

8. The system of claim 1, wherein the control signal modality is a touchscreen, and the input from the user is generated by at least one of the user's tapping and stroking on the touchscreen respectively for each syllable or word spoken by the user, on a predetermined area with a predetermined number of fingers.

9. The system of claim 1, further comprising an analog-to-digital conversion module converting the voice signal into quantized input stream and a spectral feature extraction module transforming the quantized input stream into frames of vectors.

10. The system of claim 9, wherein the inference engine comprises:
    an acoustic model mapping the frames of vectors into internal phonetic representation;
    a language model; and
    a dialog manager working with the language model for determining how the utterance is interpreted.

11. The system of claim 10, wherein the input further comprises a context information for at least one of the dialog manager and the language model, the context information indicating at least one selected from the group consisting of which language is used, whether utterance should be executed or transcribed, and whether the voice signal is related to a punctuation symbol, a programming language token, or a phrase from a predetermined vocabulary subset.

12. The system of claim 11, wherein the control signal modality is a touchscreen, and the input is generated by touching the touchscreen with a shape corresponding to tone levels of a tonal language.

13. The system of claim 10, wherein the control signal facilitates inference in the acoustic model, from ambiguities in at least one selected from the group consisting of allophones, syllable boundaries, word boundaries, prosodies, and intonations.

14. The system of claim 10, wherein the control signal facilitates inference in the language model, from ambiguities from homonym.

15. The system of claim 10, wherein the control signal facilitates interpretation of a command in the dialog manager.

16. The system of claim 1, wherein the inference engine tolerates misalignments in the control signal.

17. The system of claim 1, wherein the input from the user corresponds to tone levels of a tonal language, and the multimodal integration system disambiguates n-best candidates by using a confirmatory process.

18. The system of claim 1, wherein the input from the user corresponds to syllable boundaries and prosody in Japanese, and the multimodal integration system disambiguates n-best candidates by using a confirmatory process.

19. The system of claim 1, wherein the voice signal is generated by an artificial speech through audible or non-audible ultrasonic glottal pulse generation.

20. This system of claim 19, wherein the control signal generation and the glottal pulse generation.are integrated.

21. The system of claim 1, further comprising a confirmatory processing to confirm a partial result of n-best candidates from the inference engine executing concurrently while receiving the input.

22. A portable device having the system for the multimodal unification of articulation of claim 1.

23. A navigation system having the system for the multimodal unification of articulation of claim 1.

24. A networked service system for the multimodal unification of articulation of claim 1.

25. A method for performing a multimodal unification of articulation, comprising:
    receiving a voice signal;
    receiving an input from a user while the voice signal is being received, the input selected from predetermined inputs directly corresponding to phonetic information;
    generating a control signal generated by the input from the user to make the control signal carry phonetic information of the voice signal;
    integrating the voice signal and the control signal;
    discretizing the voice signal into phonetic frames to delimit a context of a spoken utterance of the voice signal; and
    analyzing the discretized voice signal integrated with the control signal to output a recognition result.

26. The method of claim 25, wherein the voice signal is a signal of a continuous speech.

27. The method of claim 25, wherein the input is generated by at least one selected from the group consisting of pressing a predetermined key of the keyboard, tapping the touchscreen in a predetermined pattern at a predetermined area of the touchscreen, stroking the touchscreen with a predetermined pattern at a predetermined area of the touchscreen, and moving the mouse with a predetermined pattern.

28. The method of claim 25, wherein the input is generated by at least one of the user's tapping and stroking on the touchscreen respectively for each syllable or word spoken by the user, on a predetermined area with a predetermined number of fingers.

29. The method of claim 25, wherein the voice signal is related to Chinese or Japanese language, and the integration of the voice signal and the control signal comprises preprocessing and discretizing into phonetic frames without performing an artificial Romanization.

30. The method of claim 29, wherein the input further comprises an input of touching a touchscreen with a predetermined shape corresponding to tone levels of a tonal language.

* * * * *